United States Patent
Yamaguchi et al.

(10) Patent No.: US 7,374,016 B2
(45) Date of Patent: May 20, 2008

(54) MUFFLER DEVICE

(75) Inventors: Takashi Yamaguchi, Saitama (JP); Hiroki Sakata, Saitama (JP); Yoshiyuki Ishiguri, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 11/169,764

(22) Filed: Jun. 30, 2005

(65) Prior Publication Data

US 2006/0000668 A1 Jan. 5, 2006

(30) Foreign Application Priority Data

Jul. 2, 2004 (JP) .............................. 2004-196655

(51) Int. Cl.
 *F01N 1/00* (2006.01)
 *F01N 7/00* (2006.01)
 *F01N 1/02* (2006.01)

(52) U.S. Cl. ...................... 181/249; 181/227; 181/228; 181/282; 181/283

(58) Field of Classification Search ................ 181/249, 181/227, 228, 255, 282, 283, 212; 60/308, 60/316, 319, 321; 180/309; 138/109, 110, 138/112, 113, 148
See application file for complete search history.

(56) References Cited

U.S. PATENT DOCUMENTS

| 3,116,803 | A | * | 1/1964 | Buchwald | 180/309 |
| 4,354,573 | A | * | 10/1982 | Tabata et al. | 181/239 |
| 4,487,289 | A | * | 12/1984 | Kicinski et al. | 181/252 |
| 4,793,293 | A | * | 12/1988 | Minami | 123/41.7 |
| 5,121,810 | A | * | 6/1992 | Araki | 181/198 |
| 6,148,537 | A | * | 11/2000 | Altamore | 34/97 |
| 6,220,387 | B1 | | 4/2001 | Hoppes et al. | |
| 6,438,949 | B1 | * | 8/2002 | Nozaki | 60/322 |
| 7,156,202 | B2 | * | 1/2007 | Assad | 181/258 |
| 2001/0015301 | A1 | * | 8/2001 | Kesselring | 181/249 |

FOREIGN PATENT DOCUMENTS

| DE | 43 22 436 A1 | 1/1995 |
| JP | 63-227177 | 3/1990 |
| JP | 5-38122 B2 | 2/1993 |

* cited by examiner

*Primary Examiner*—Lincoln Donovan
*Assistant Examiner*—Forrest Phillips
(74) *Attorney, Agent, or Firm*—Birch, Stewart, Kolasch & Birch, LLP

(57) ABSTRACT

To provide a muffler device capable of improving the discharge of exhaust gas, while discharging the exhaust gas in any desired direction. The muffler device is connected to a rear end portion of an exhaust pipe extending from an internal combustion engine of a vehicle. An exhaust outlet opening is provided that opens outwardly and laterally of the vehicle and is disposed at a rear portion of a muffler main body. The muffler main body is provided with a muffler side cover and an end cap as muffler covers. The muffler side cover includes a slit. The slit serves as an air intake guide shaped portion for guiding ambient air so that the ambient air crosses the exhaust outlet.

20 Claims, 12 Drawing Sheets

MUFFLER DEVICE

CROSS-REFERENCE TO RELATED APPLICATIONS

The present application claims priority under 35 USC 119 to Japanese Patent Application No. 2004-196655 filed on Jul. 2, 2004 the entire contents of which are hereby incorporated by reference.

FIELD OF THE INVENTION

The present invention relates to a muffler device applied to a vehicle including a motorcycle.

DESCRIPTION OF BACKGROUND ART

In a muffler device connected to a rear end portion of an exhaust pipe extending from an internal combustion engine of a vehicle, there has conventionally been known an arrangement, in which a tail pipe constituting an exhaust outlet is bent in a desired direction, for example, outward of the vehicle. See, for example, Japanese Patent Publication No. Hei 5-38122.

A reduction in the size and weight of the bodies and a reduction in exhaust noise is at a premium in newly released vehicles. When an attempt is made to reduce the size of the muffler main body and enhance the noise reduction performance in line with the aforementioned needs, the arrangement cited above could result in the escape of exhaust gas.

SUMMARY AND OBJECTS OF THE INVENTION

It is therefore an object of the present invention to provide a muffler device capable of improving the discharge of the exhaust gas, while discharging the exhaust gas in any desired direction.

As a means for solving the above problem, a first aspect of the present invention provides a muffler device 50 that is connected to a rear end portion of an exhaust pipe 44 extending from an internal combustion engine 16 of a vehicle such as a motorcycle 1. The muffler device includes a muffler main body 51, an exhaust outlet 74 disposed at a rear portion of the muffler main body that opens outwardly and laterally the vehicle and a muffler cover 52 and an end cap 53 provided for the muffler main body. An embodiment of the present invention provides the muffler cover that includes an air intake guide shaped portion, e.g., a slit 96, for guiding ambient air to the exhaust outlet.

According to an embodiment of the present invention, a muffler side cover is fitted to an outer periphery of the muffler main body and the muffler side cover includes a slit provided as the air intake guide shaped portion.

According to this arrangement, the ambient air guided to the air intake guide shaped portion crosses the exhaust outlet. This generates a negative pressure in an area around the exhaust outlet and the negative pressure acts to draw exhaust gas from the exhaust outlet. This improves the discharge of the exhaust gas, while allowing the exhaust gas to be discharged in any desired direction, for example outwardly and laterally the vehicle. If the air intake guide shaped portion is the slit provided for the muffler side cover, a velocity of the ambient air flowing along the muffler side cover builds up when the wind flows past the slit. The ambient air in this condition is guided to the exhaust outlet, which enhances an exhaust gas drawing effect. This also contributes to improved heat radiation performance of the muffler side cover and the muffler main body.

According to an embodiment of the present invention, the muffler cover includes an end cap 53 for covering an area surrounding the exhaust outlet of the muffler main body. Further, the end cap includes a recessed portion 87 provided as the air intake guide shaped portion and the recessed portion includes an exposed hole 86 provided for the exhaust outlet.

According to this arrangement, the ambient air can be guided smoothly to the exhaust outlet. If a tail pipe extends from a rear portion of the muffler main body and a leading end opening thereof is made to serve as the exhaust outlet, the length of the tail pipe extending from the muffler main body can be kept small.

According to an embodiment of the present invention, the exhaust outlet is located between an outer side portion and a lower side portion of the muffler main body.

According to this arrangement, the exhaust outlet is open to face obliquely downwardly and outwardly, in which direction there are less obstacles for guiding the ambient air. Discharge of the exhaust gas by the ambient air can therefore be even further improved. Moreover, entry of rainwater and the like through the exhaust outlet can be prevented and the exhaust outlet can be made less noticeable.

According to an embodiment of the present invention, at least one connection portion 84 for connecting the muffler main body and the muffler side cover is disposed at an area near the air intake guide shaped portion.

According to this arrangement, the stiffness of the area near the air intake guide shaped portion of the muffler side cover can be supplemented.

According to the embodiments of the present invention, an improvement in an output of the vehicle and a reduction in fuel consumption can be promoted, while allowing the exhaust gas to be guided in any desired direction. Further, a cooling performance of surrounding parts can be enhanced.

According to an embodiment of the present invention, discharge of the exhaust gas can be improved even further and a reduction in weight of the muffler main body can also be enhanced.

According to an embodiment of the present invention, discharge of the exhaust gas can be improved even further and the corrosion resistance and appearance quality of the muffler main body can also be improved.

According to an embodiment of the present invention, vibration and noise occurring as a result of the ambient air flowing through can be suppressed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will be described with reference to the accompanying drawings. In the description given hereunder, fore-and-aft, and right-and-left directions, and the like correspond to the directions of the vehicle unless otherwise specified. In the accompanying drawings, an arrow FR points forward of the vehicle, an arrow LH points leftward of the vehicle, and an arrow UP points upward of the vehicle.

Figure 1:
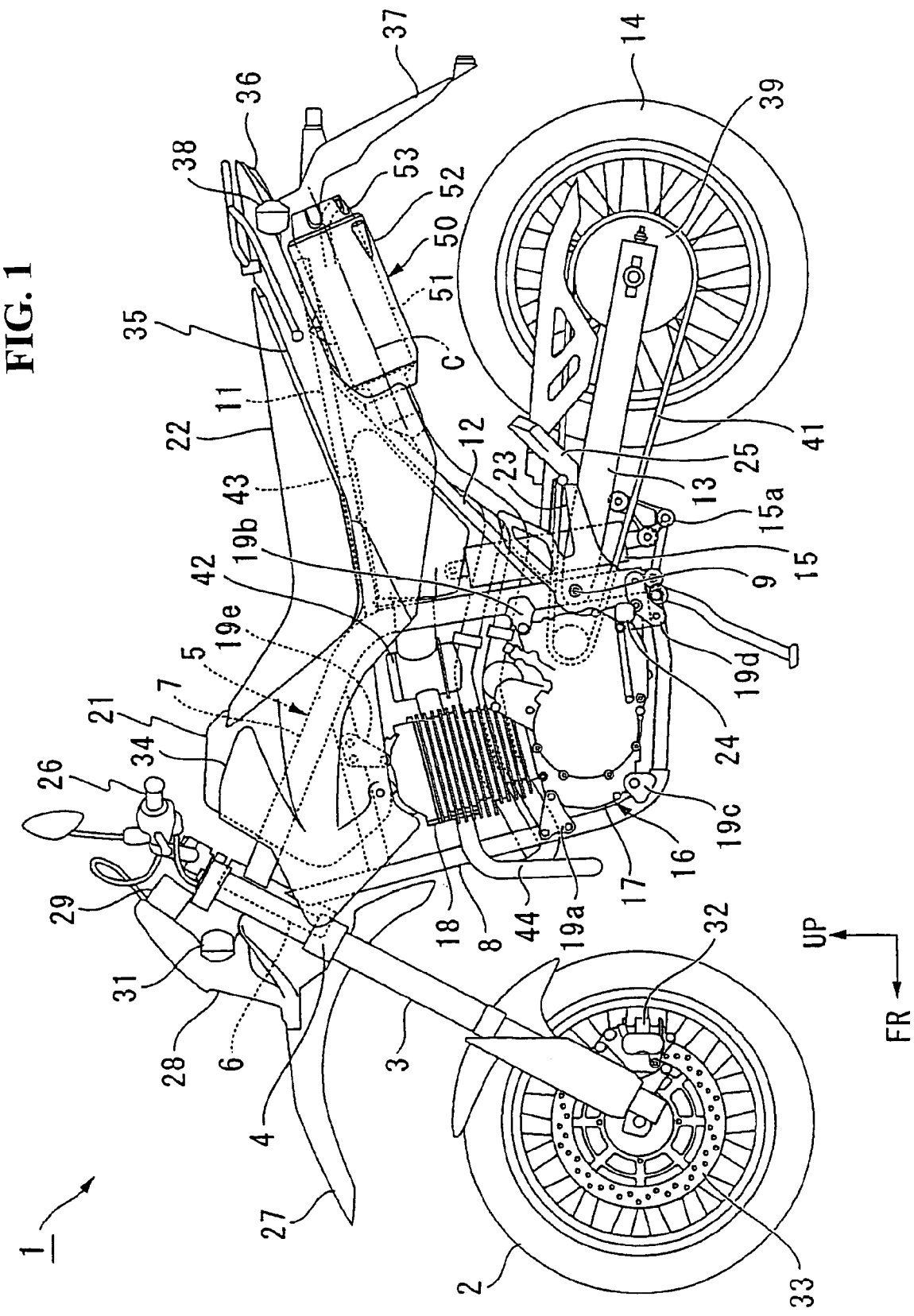
FIG. 1 is a side elevational view showing a motorcycle according to a preferred embodiment of the present invention.

Referring to FIG. 1, a pair of right and left front forks 3 for journaling a front wheel 2 of a motorcycle (vehicle) 1 is steerably pivotally supported by a head pipe 6 of a vehicle body frame 5 via a steering stem 4. The vehicle body frame 5 is a cradle type. The vehicle body frame 5 is formed by an upper tube 7 and a down tube 8. The upper tube 7 extends rearwardly from an upper portion of the head pipe 6 and then curves downwardly. The down tube 8 extends downwardly from a lower portion of the head pipe 6 and then curves rearwardly. A lower end portion of the upper tube 7 is joined to a rear end portion of the down tube 8 at a point near a swing arm pivot 9 to form the cradle.

A front end portion of a seat rail 11 extends rearwardly and is joined to a curved portion of the upper tube 7. A front end portion of a sub frame 12 is joined to the upper tube 7 at a point near the swing arm pivot 9. The sub frame 12 extends obliquely upwardly and rearwardly to support a point near a center of the seat rail 11.

A proximal end portion of a swing arm 13 is swingably pivotally supported on the swing arm pivot 9. A rear wheel 14 is journaled on a distal end portion of the swing arm 13. A rear cushion 15 is disposed near the proximal end portion of the swing arm 13. An upper end portion of the rear cushion 15 is connected to the upper tube 7 and a lower end portion thereof is connected to the swing arm 13 via a linkage mechanism 15a.

A single-cylinder engine (hereinafter referred to simply as engine) 16 as an internal combustion engine is disposed at a central portion of the vehicle enclosed by the upper tube 7 and the down tube 8. The engine 16 includes a crankshaft that runs in parallel in a vehicle width direction. The engine 16 has a structure, in which a cylinder portion 18 is arranged in a standing condition upward and at a front portion of a crankcase 17. An upper portion front side of the crankcase 17 is supported by a lower portion of the down tube 8 via a first bracket 19a. An upper portion rear side of the crankcase 17 is supported by a lower portion of the upper tube 7 via a second bracket 19b. In addition, a lower portion front side of the crankcase 17 is supported by the lower portion of the down tube 8 via a third bracket 19c. A lower portion rear side of the crankcase 17 is supported by the lower portion of the upper tube 7 via a fourth bracket 19d. Further, an upper portion of the cylinder portion 18 is supported by an upper portion of the upper tube 7 via a fifth bracket 19e.

A fuel tank 21 is disposed upward of the engine 16. The fuel tank 21 is supported by the upper tube 7. A seat 22 supported by the seat rail 11 is disposed rearward of the fuel tank 21. A front half portion of the seat 22 is for a rider, while a rear half portion thereof is for a rear passenger. A step bracket 23 is connected to a lower end portion of the upper tube 7. A rider step 24 is fitted to a front end portion of the step bracket 23. A rear passenger step 25 is fitted to a rear end portion of the step bracket 23.

A handlebar 26 is mounted on an upper portion of the steering stem 4. A front fender 27 is attached to a lower portion of the steering stem 4. A headlamp 28, a meter device 29, right and left front turn signal lamps 31, and the like are mounted via a support stay not shown on the steering stem 4. A brake caliper 32 is mounted on a lower portion of the front forks 3. A brake disc 33 corresponding to the brake caliper 32 is mounted on a hub portion of the front wheel 2. A front disc brake is formed mainly by the brake caliper 32 and the brake disc 33.

Tank covers 34 are mounted on both sides of the fuel tank 21. The tank covers 34 extend to a point forward of the fuel tank 21, functioning also as an air intake guide for the engine 16. Each of the tank covers 34 extends up to a point near a center of the seat 22. Each of the tank covers 34 is disposed such that a rear end portion thereof forms a continuous part with a front end portion of a rear cowl 35 mounted to the seat rail 11. A tail lamp 36 is disposed at a rear end portion of the rear cowl 35. Rear turn signal lamps 38 are disposed on both sides of the tail lamp 36. A rear fender 37 extends downwardly from a point near the tail lamp 36.

A rear sprocket 39 is mounted on the left-hand side of the rear wheel 14. A drive chain 41 is wound around the rear sprocket 39 and a drive sprocket disposed on the left-hand side in rear of the engine 16. A driving force of the engine 16 can thereby be transmitted to the rear wheel 14. A rear disc brake (not shown) having the same arrangement as the front disc brake is disposed on the right-hand side of the rear wheel 14.

Figure 2:
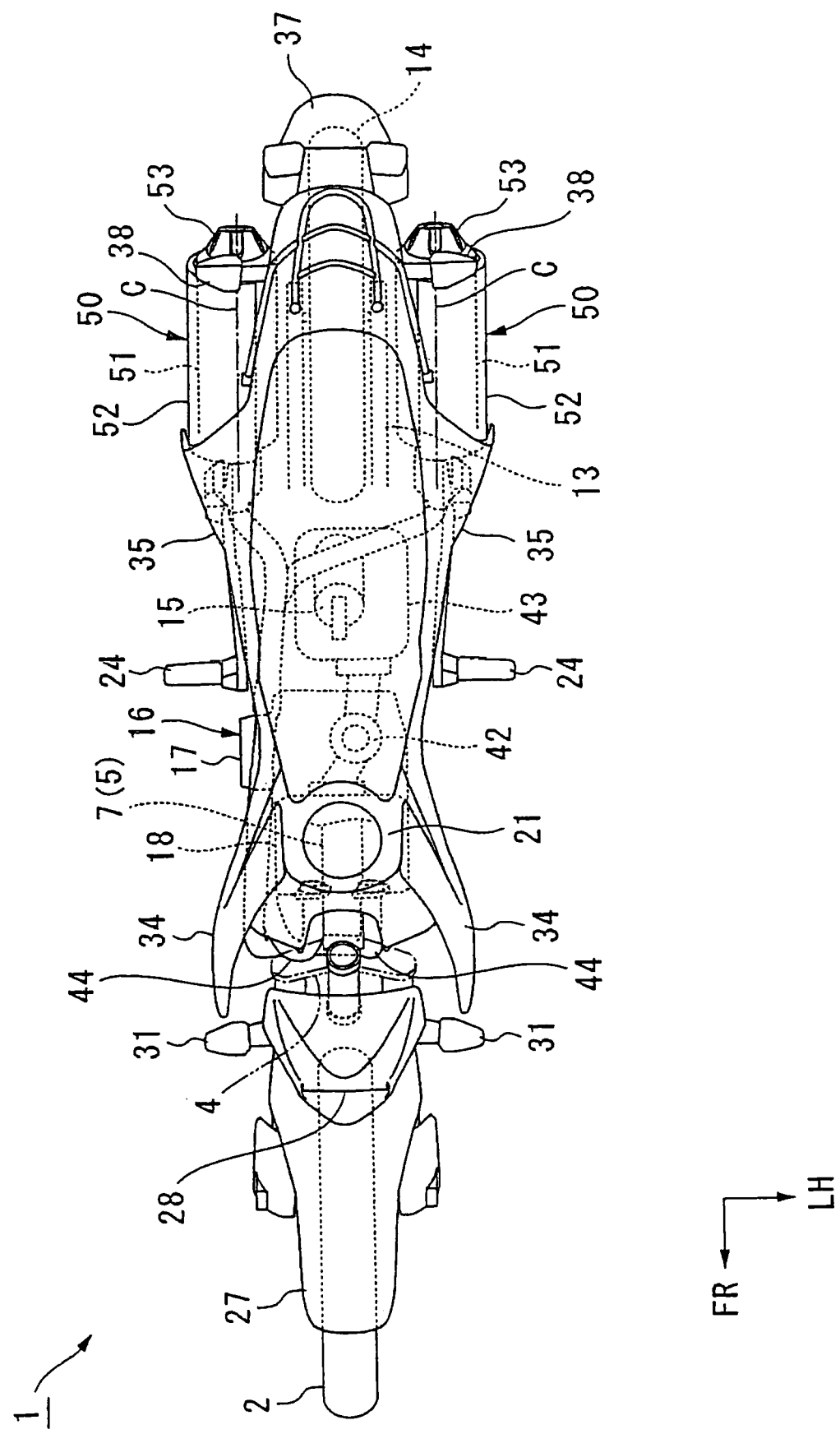
FIG. 2 is a top view showing the motorcycle according to the preferred embodiment of the present invention.

A downstream side of a carburetor 42 is connected to a rear portion of the cylinder portion 18 of the engine 16. An air cleaner case 43 is connected to an upstream side of the carburetor 42. Reference is now made also to FIG. 2. A pair of exhaust pipes 44 corresponding to a pair of right and left exhaust ports is connected to a front portion of the cylinder portion 18. Each of the exhaust pipes 44 extends forwardly of the cylinder portion 18. Each of the exhaust pipes 44 then curves to be routed to the right of the cylinder portion 18 and then extends rearwardly of the rear cushion 15. The exhaust pipes 44 thereafter extend obliquely upwardly and rearwardly and are branched out to the right and left. Rear end portions of the branches are then connected to front end portions of a pair of right and left muffler devices 50. The pair of right and left muffler devices 50 is disposed obliquely downwardly and outboard of the seat rail 11.

A muffler device 50 on the left-hand side of the vehicle will be described as follows. The pair of right and left muffler devices 50 is of opposite hand and the description of the left muffler device will be omitted.

Figure 3:
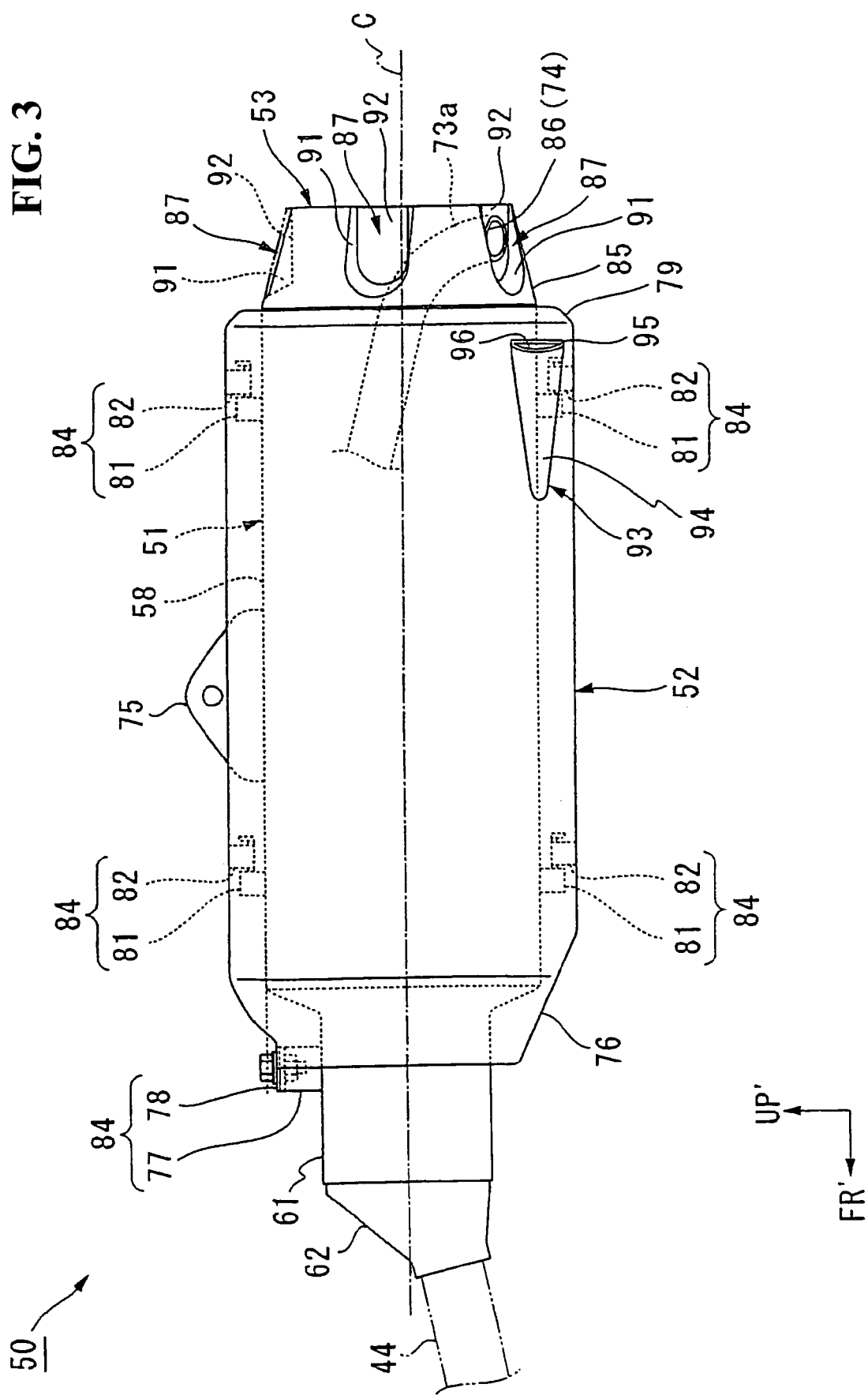
FIG. 3 is a side elevational view showing a muffler device mounted in the motorcycle according to the preferred embodiment of the present invention.
Figure 6:
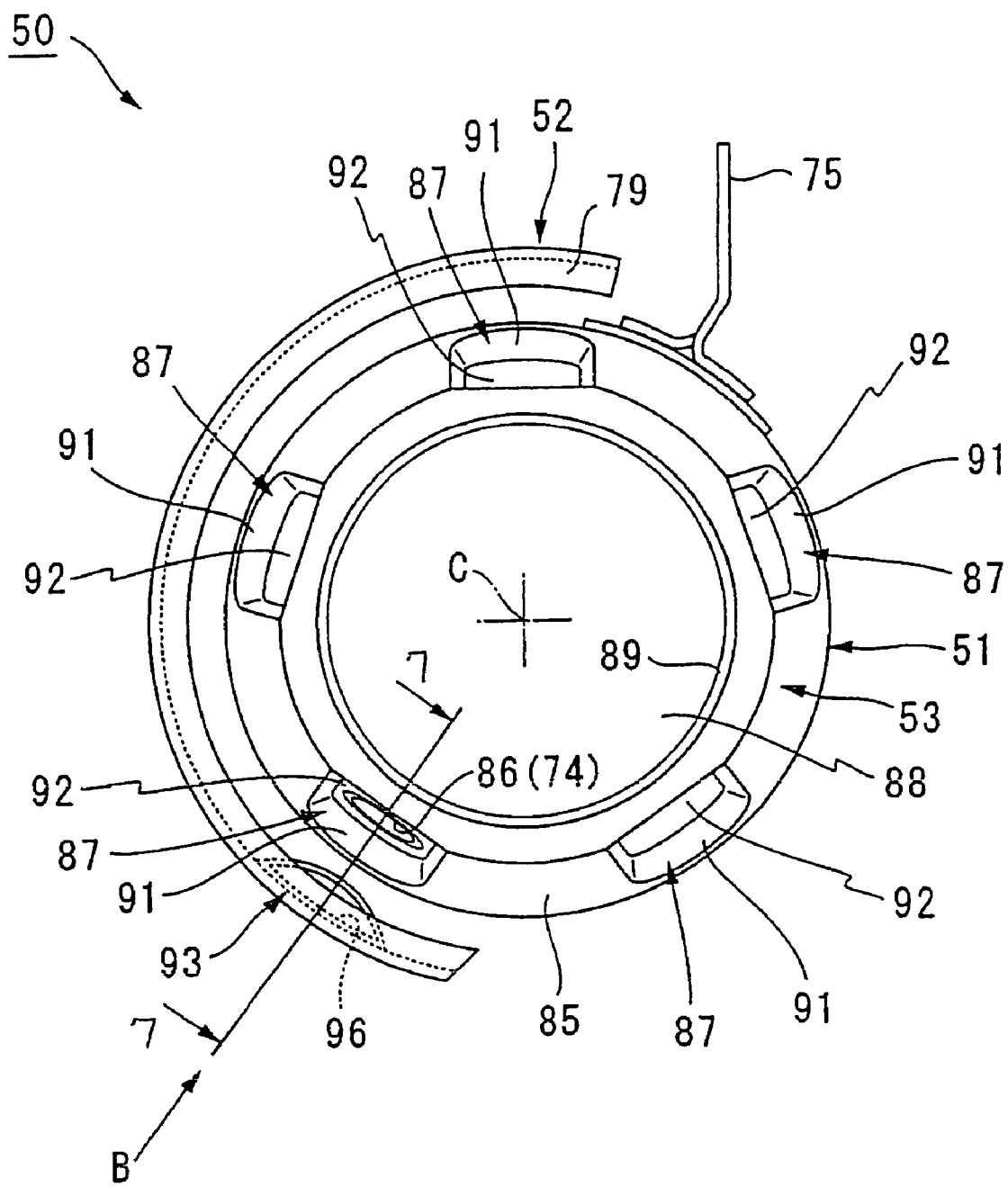
FIG. 6 is a rear view showing the muffler device mounted in the motorcycle according to the preferred embodiment of the present invention.

Referring to FIGS. 3 and 6, the muffler device 50 includes a muffler main body 51, a muffler side cover (a muffler cover) 52, and an end cap (a muffler cover) 53. The muffler main body 51 is substantially a cylindrical shape. The muffler side cover 52 is fitted to an outer periphery of the muffler main body 51. The end cap 53 is fitted to a rear end portion of the muffler main body 51. The muffler device 50 constructed in the aforementioned manner is disposed at a rear portion of the vehicle. At that portion, the muffler device 50 takes a posture, in which an axis C thereof is inclined downwardly toward the front along a side surface of the vehicle body (see FIG. 1). An arrow FR' indicated in each of different drawings represents a forward direction along the axis C of the muffler device 50. An arrow UP' indicated in each of different drawings represents an upward direction in a direction perpendicular to the axis C of the muffler device 50 in a side view.

Figure 5:
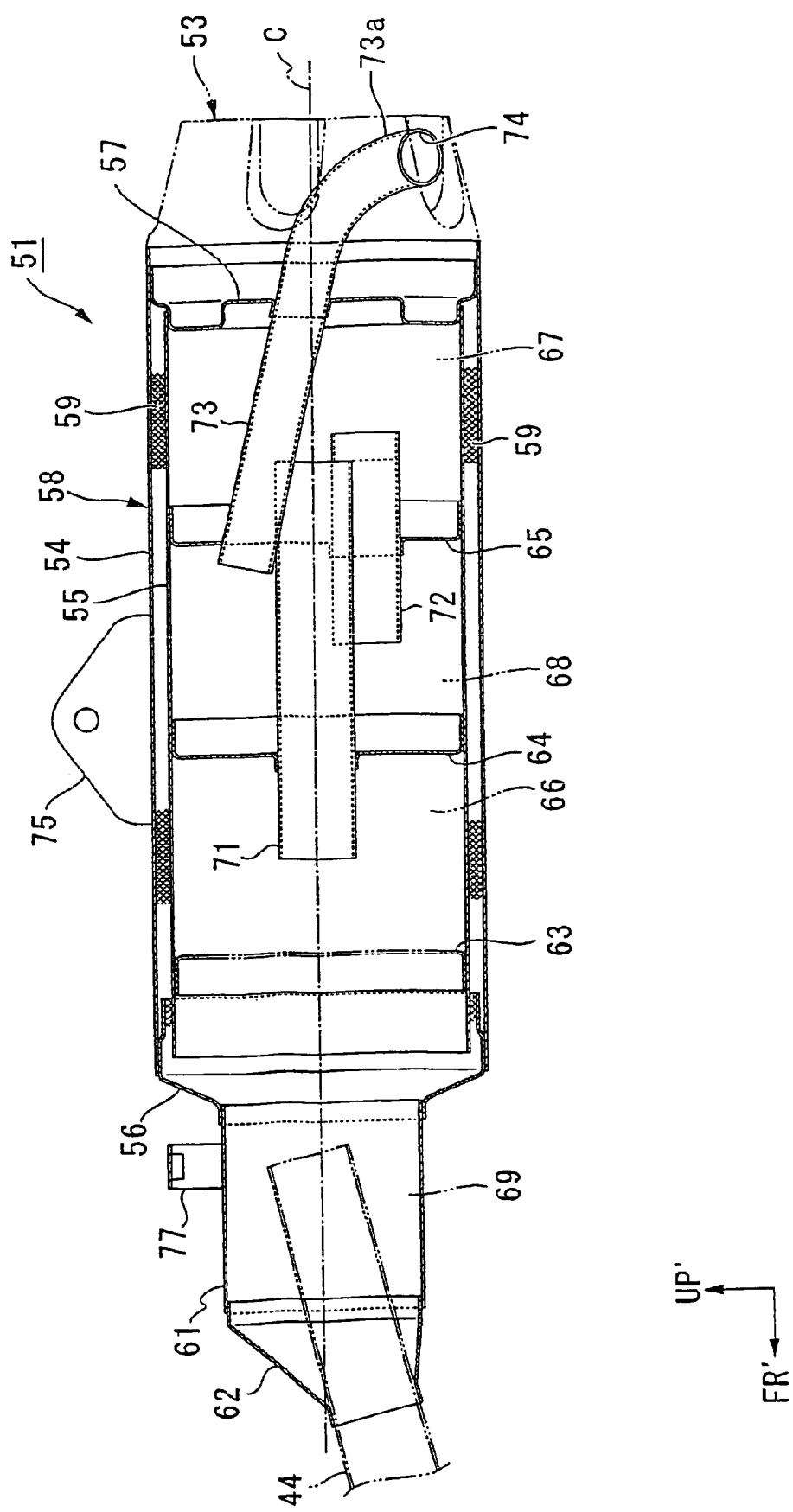
FIG. 5 is a cross sectional view for explaining a muffler main body.

Referring to FIG. 5, the muffler main body 51 includes an outer tube 54, an inner tube 55, a front plate 56, and a rear plate 57. The outer tube 54 constitutes an outer peripheral wall of the muffler main body 51. The inner tube 55 is disposed inside the outer tube 54. The front plate 56 and the rear plate 57 are disposed at a front end portion and a rear end portion, respectively, of the outer tube 54 and the inner tube 55 with a predetermined distance away from each other. These components are integrally connected together to form a tubular body 58 of a dual structure. Glass wool 59 provides a noise absorbing and heat insulating material that is packed in a gap between the outer tube 54 and the inner tube 55.

The front plate 56 is provided with an opening at a central portion thereof. A rear end portion of a cylindrical pipe 61 that includes a diameter that is smaller than a diameter of the tubular body 58 is connected to an inner peripheral portion of the opening. A rear end portion of a connection pipe 62 is connected to a front end portion of the cylindrical pipe 61. The connection pipe 62 has a diameter that diminishes toward a forward end thereof. The connection pipe 62 is provided with an opening at a front end portion thereof. A rear end portion of the exhaust pipe 44 can be inserted into the connection pipe 62 and the cylindrical pipe 61.

Three bulkheads 63, 64, 65 are disposed inside the tubular body 58 (inner tube 55). The bulkheads 63, 64, 65 are placed so as to partition an interior space inside the tubular body 58 in the direction of the axis C. The bulkheads 63, 64, 65 are hereinafter referred to as a first bulkhead 63, a second bulkhead 64, and a third bulkhead 65, respectively, in that order from the bulkhead on the side of the front plate 56. Further, a space formed between the first bulkhead 63 and the second bulkhead 64 is referred to as a first expansion chamber 66. A space formed between the third bulkhead 65 and the rear plate 57 is referred to as a second expansion chamber 67. A space formed between the second bulkhead 64 and the third bulkhead 65 is referred to as a third expansion chamber 68.

The first bulkhead 63 is called a punching metal which is a steel plate having a large number of small-diameter holes. Communication is provided between a preliminary expansion chamber 69 reaching an interior space of the cylindrical pipe 61 forward of the first bulkhead 63 and the first expansion chamber 66. Further, communication is provided between the first expansion chamber 66 and the second expansion chamber 67 by way of a first communication pipe 71 that penetrates through the second bulkhead 64 and the third bulkhead 65. In addition, communication is provided between the second expansion chamber 67 and the third expansion chamber 68 by way of a second communication pipe 72 that penetrates through the third bulkhead 65. Further, communication is provided between the third expansion chamber 68 and an outside space (atmosphere) rearward of the rear plate 57 by way of a third communication pipe 73 that penetrates through the third bulkhead 65 and the rear plate 57.

Accordingly, exhaust gas from the engine 16 first flows from the exhaust pipe 44 to the preliminary expansion chamber 69. The exhaust gas then flows into the first expansion chamber 66 through the first bulkhead 63. The exhaust gas further flows into the second expansion chamber 67 through the first communication pipe 71. The exhaust gas further flows into the third expansion chamber 68 through the second communication pipe 72. The exhaust gas is thereafter discharged out of the muffler main body 51 through the third communication pipe 73. In this manner, the exhaust gas having a high temperature and high pressure and introduced into the muffler main body 51 flows past the plurality of the expansion chambers 66, 67, 68. Through the aforementioned process, the exhaust gas is cooled and depressurized. Exhaust noise is thereby effectively reduced.

A front end portion of the third communication pipe 73 penetrates through an upper portion of the third bulkhead 65 to face the inside of the third expansion chamber 68. The third communication pipe 73 extends obliquely downwardly and rearwardly from the front end portion thereof to penetrate through substantially a central portion of the rear plate 57. A portion of the third communication pipe 73 extending rearwardly from the rear plate 57 is a tail pipe 73*a*. The tail pipe 73*a* is formed by being bent such that a leading end opening thereof, that is, an exhaust outlet 74 is open to face obliquely downwardly and outwardly (see FIG. 6). It can be said that a leading end portion of such a tail pipe 73*a* is located between an outer side portion and a lower side portion of the muffler main body 51. There is mounted on an upper side portion of the tubular body 58 (outer tube 54) a stay 75 for securing the muffler device 50 to the seat rail 11.

Figure 4:
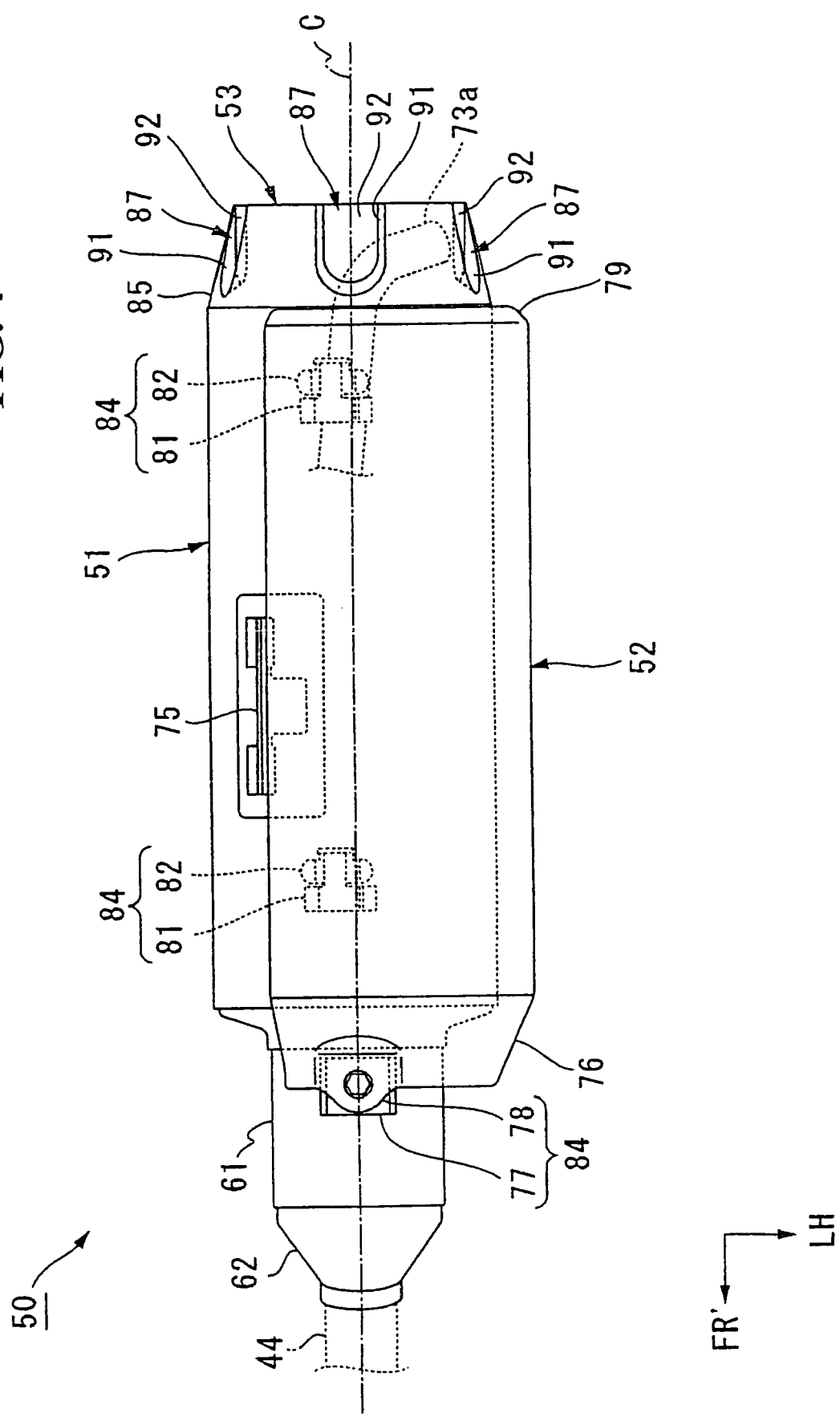
FIG. 4 is a top view showing the muffler device mounted in the motorcycle according to the preferred embodiment of the present invention.

Referring to FIGS. 3, 4, and 6, the muffler side cover 52 covers the muffler main body 51 with substantially a predetermined clearance therefrom as follows. More specifically, in a side view, the muffler side cover 52 covers a portion from a rear portion of the cylindrical pipe 61 to a point near the rear plate 57. In a view looking in the direction of the axis C, the muffler side cover 52 covers a portion from a point near an upper side portion of the muffler main body 51 to a point near a lower side portion thereof. A front portion of the muffler side cover 52 is formed into a taper portion 76 whose diameter diminishes towards the front. A fixing portion 78 is formed on a front end upper side portion of the taper portion 76. The fixing portion 78, corresponding to a pedestal portion 77 is disposed on an upper side portion of the cylindrical pipe 61. An inclined wall portion 79 is formed at a rear edge portion of the muffler side cover 52.

The inclined wall portion 79 is inclined such that a rear end of the muffler side cover 52 is changed inwardly and radially of the muffler device 50, hereinafter simply referred to as radially.

Referring to FIGS. 3 and 4, locking stays 81 are mounted on the outer tube 54 of the muffler main body 51. Corresponding to each of these locking stays 81, there is mounted a locked stay 82 at each of the following locations, an inner surface on the upper side portion at a front side and a rear side and an inner surface on the lower side portion at a front side and a rear side of the muffler side cover 52.

Figure 9:
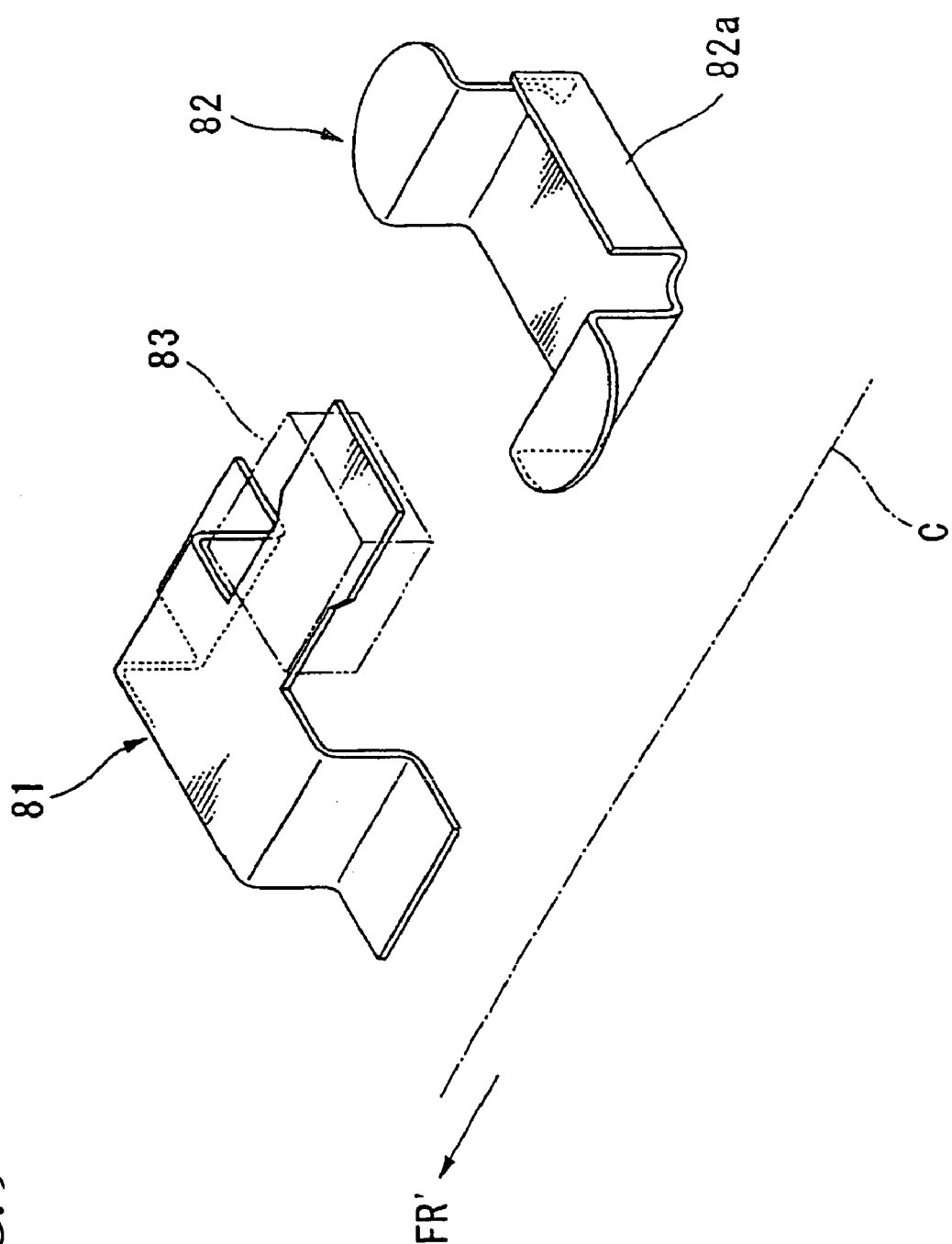
FIG. 9 is a perspective view for explaining a stay for connecting the muffler main body and a muffler side cover.

Reference is now also made to FIG. 9. Each of the locked stays 82 can be brought into engagement with a corresponding one of the locking stays 81 by being moved forward from the rear along the direction of the axis C. Each of the locked stays 82 can be brought out of engagement with the corresponding one of the locking stays 81 by being moved, from the aforementioned condition, rearwardly. An elastic body 83 made of synthetic rubber or the like is mounted in each of the locking stays 81. Elastic engagement can be effected between each of the locking stays 81 and each of the locked stays 82 by way of the elastic body 83.

The muffler side cover 52 having the arrangements as described above can be mounted to the muffler main body 51 as follows. Specifically, the muffler side cover 52 is moved so as to be slid forward along the direction of the axis C from a position rearwardly of a position of mounting to the muffler main body 51. Each of the locking stays 81 is then engaged with the corresponding one of the locked stays 82. The pedestal portion 77 and the fixing portion 78 are then connected together using a bolt or the like. To state it another way, each of the pair of the locking stays 81 and the locked stays 82, and the pedestal portion 77 and the fixing portion 78, constitutes a connection portion 84 between the muffler main body 51 and the muffler side cover 52. Each of the locked stays 82 includes a stopper wall 82a, against which a leading end of each of the locking stays 81 abuts and by which a relative position of each of the locking stays 81 and the locked stays 82 along the direction of the axis C is restricted.

The end cap 53 is of a cylindrical shape and includes a bottom. Fitting the end cap 53 to a rear end portion of the muffler main body 51 with an opening thereof facing forward will house the tail pipe 73a inside the end cap 53.

Referring to FIGS. 3 and 6, an outer peripheral wall 85 of the end cap 53 is provided with an exposed hole 86 for the exhaust outlet 74 of the tail pipe 73. The exposed hole 86 allows the exhaust gas from the exhaust outlet 74 to be discharged out of the end cap 53. To state it another way, the end cap 53 covers a surrounding area of the exhaust outlet 74.

A front end portion of the outer peripheral wall 85 of the end cap 53 has substantially the same diameter as the muffler main body 51. The end cap 53 has a mild taper having a diameter that diminishes toward the rear from the front end portion. The outer peripheral wall 85 includes five recessed portions 87, each having substantially an identical shape, equally spaced in a circumferential direction of the end cap 53. A bottom wall 88 of the end cap 53 includes a step portion 89. The step portion 89 includes a portion on the central side that changes toward the front relative to a peripheral edge portion of the bottom wall 88 (see FIG. 7).

Figure 7:
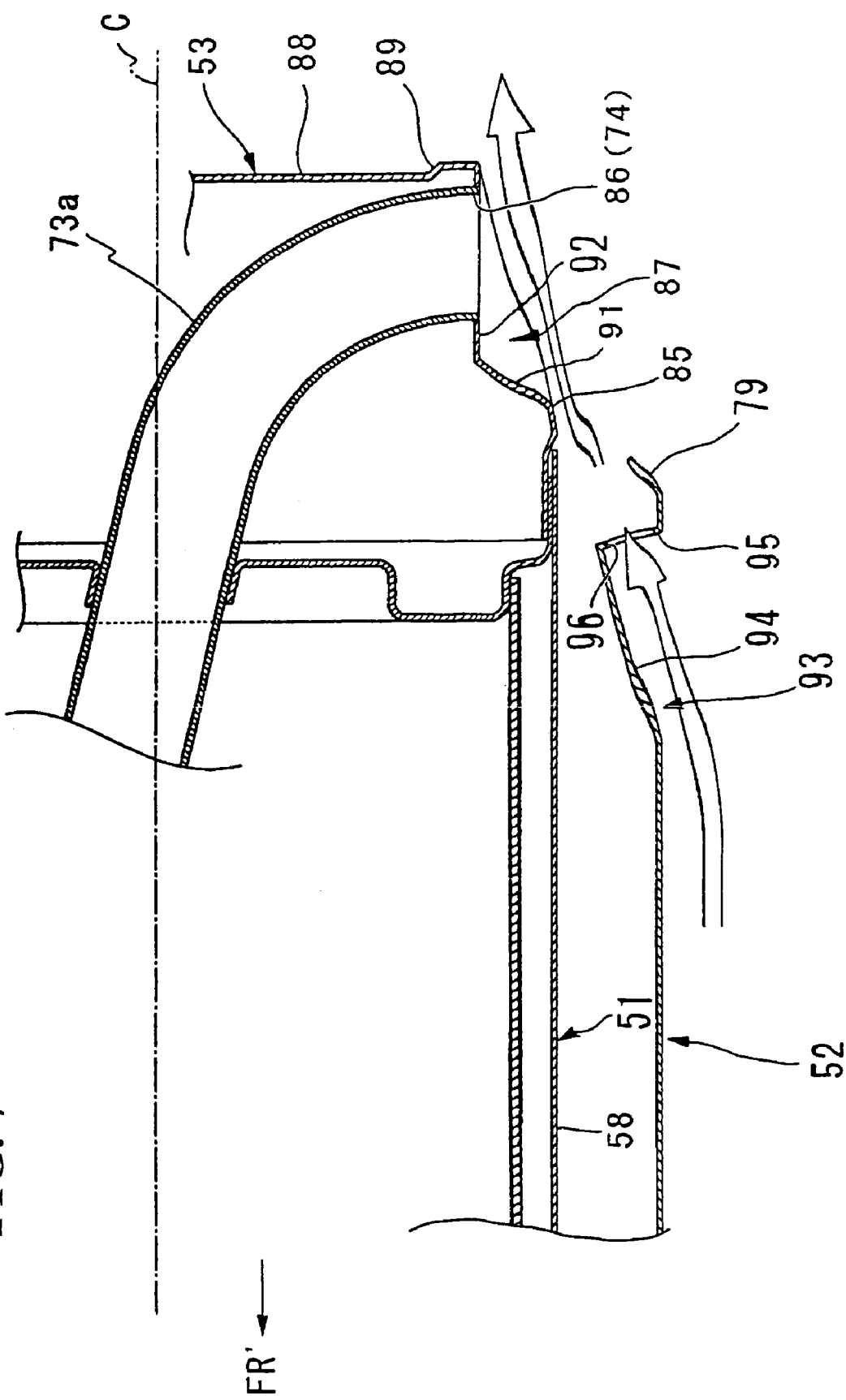
FIG. 7 is a cross sectional view take along line 7-7 of FIG. 6.

Reference is now made also to FIG. 7. Each of the recessed portions 87 is formed as follows. Specifically, part of the. outer peripheral wall 85 is changed in a step form radially inwardly. A front half portion of the recessed portion 87 is semi-circular, opening rearwardly in a side view. A rear half portion thereof extends linearly rearwardly to reach a rear end of the end cap 53. An inner peripheral wall 91 of the recessed portion 87 is radially inclined such that an outer peripheral shape of a bottom wall 92 of the recessed portion 87 is reduced relative to a shape of a ridge with the outer peripheral wall 85. Moreover, the inner peripheral wall 91 in the front half portion of the recessed portion 87 is formed to provide a greater inclination radially. In other words, the inner peripheral wall 91 is formed so that the outer peripheral wall 85 continues to the bottom wall 92 relatively smoothly. The bottom wall 92 of each of the recessed portions 87 is formed to run substantially in parallel with and flatly the axis C relative to the tapered outer peripheral wall 85.

One of the recessed portions 87 is disposed on an upper side portion of the end cap 53 (see FIG. 4). With reference to this particular recessed portions 87, the rest of the recessed portions 87 are equally spaced in the circumferential direction of the end cap 53. The bottom wall 92 of a specific one of the recessed portions 87 located at an obliquely lower outside of the end cap 53 is provided with the aforementioned exposed hole 86 for the exhaust outlet 74. Accordingly, the shape of the recessed portion 87 camouflages the presence of the exhaust outlet 74. This makes for a novel appearance of the rear portion of the muffler device 50, enhancing the product value of the vehicle.

Figure 8:
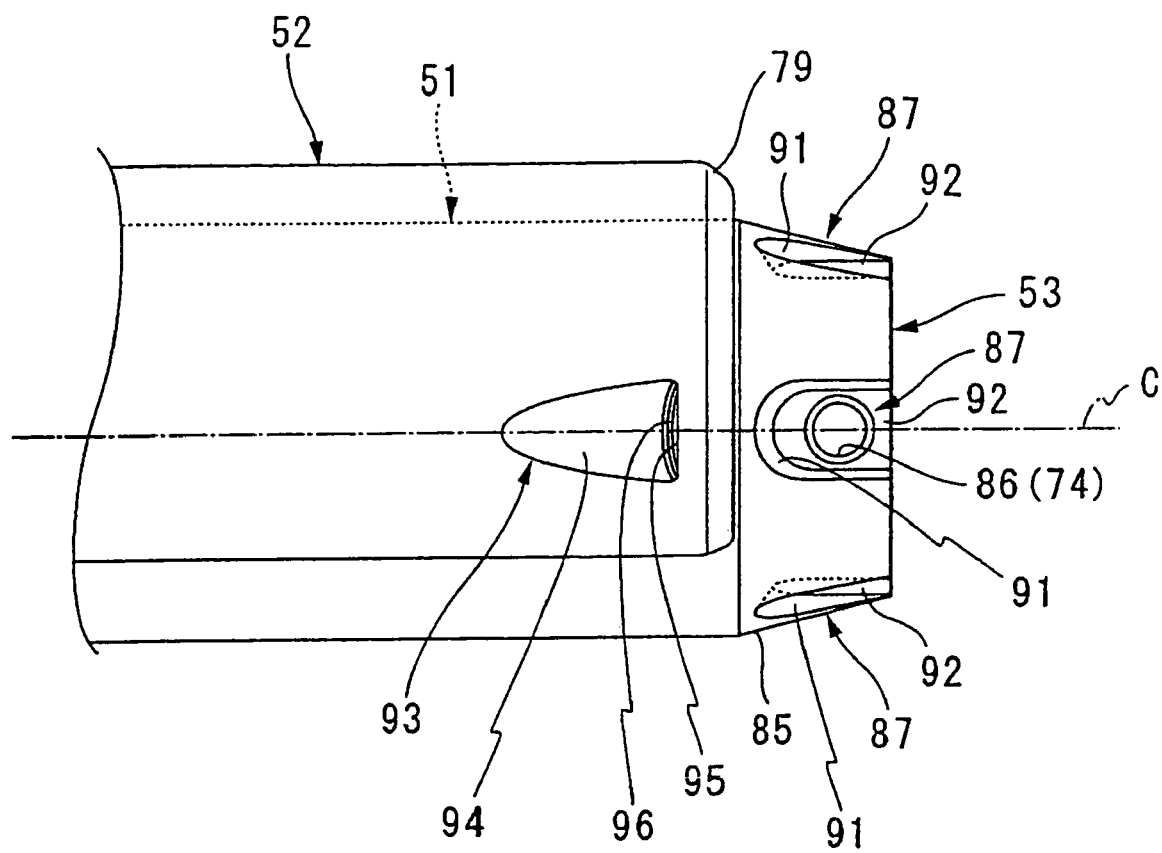
FIG. 8 is a view on arrow B of FIG. 6.

Reference is now made also to FIG. 8. The muffler side cover 52 includes an outside air introduction portion 93. The outside air introduction portion 93 is provided at a portion immediately before the exhaust outlet 74 in a rear portion of the muffler side cover 52. The outside air introduction portion 93 is formed by changing part of the muffler side cover 52 radially inwardly. That is, like the exhaust outlet 74, the outside air introduction portion 93 is located at an obliquely lower outside in a rear portion of the muffler side cover 52. The outside air introduction portion 93 is an isosceles triangle having a longer length in the fore-aft direction in a side view thereof. A rear end of the outside air introduction portion 93 is the base of the isosceles triangle, the base running along a circumferential direction of the muffler side cover 52. The outside air introduction portion 93 includes a guide wall 94 and a riser wall 95. The guide wall 94 increases its depth in a radial direction toward the base side relative to the side of a front end thereof. The riser wall 95 rises substantially orthogonally with respect to the guide wall 94 from a rear edge of the guide wall 94 toward an outer surface of the muffler side cover 52. The riser wall 95 of the outside air introduction portion 93 is provided with a slit (an air intake guide shaped portion) 96 that is longer along a circumferential direction of the muffler side cover 52.

The outside air introduction portion 93 serves the following purpose. More specifically, while the motorcycle 1 is being operated, part of the ambient air, air blown from forward direction of the vehicle, flows over a surface of the muffler side cover 52 and is guided along the guide wall 94 to the slit 96. While flowing past the slit 96, the ambient air builds up its velocity before passing through the riser wall 95 rearwardly. At this time, the ambient air blows along inclination of the guide wall 94 relatively radially inwardly and obliquely rearwardly. In the meantime, the inclined wall portion 79 at the rear edge portion of the muffler side cover 52 serves also as an air intake guide shaped portion for guiding the ambient air. This results in the ambient air that has flowed past the slit 96 being blown radially inwardly and obliquely rearwardly against the end cap 53.

The specific one of the recessed portions 87, at which the exhaust outlet 74 is disposed, is located radially inwardly and obliquely rearwardly relative to the outside air introduction portion 93. The inner peripheral wall 91 in the front half portion of the specific one of the recessed portions 87 is disposed so as to substantially continue to the guide wall 94 of the outside air introduction portion 93. More specifically, the ambient air guided to the slit 96 advances smoothly along the inner peripheral wall 91 into the recessed portion 87. The ambient air then crosses the exhaust outlet 74 located immediately rearwardly of the inner peripheral wall 91 along the bottom wall 92 of the recessed portion 87. The ambient air thereafter flows to the rear of the end cap 53. That is, the specific one of the recessed portions 87 functions also as an air intake guide shaped portion. Accordingly, while the motorcycle 1 is being operated, the area surrounding the exhaust outlet 74 is placed in a vacuum state using the ambient air. This allows the exhaust gas from the exhaust outlet 74 to be properly drawn out.

As described in the foregoing, the muffler device 50 according to the preferred embodiment of the present invention is connected to the rear end portion of the exhaust pipe 44 extending from the engine 16. The muffler main body 51 includes the exhaust outlet 74 that is open outwardly and laterally and is disposed in the rear thereof. In addition, the muffler side cover 52 and the end cap 53 are mounted thereon as muffler covers. The muffler side cover 52 is further provided with the slit 96 as the air intake guide shaped portion for guiding the ambient air such that the ambient air crosses the exhaust outlet 74.

According to the preferred embodiment having the arrangements as described above, the ambient air with an increased velocity while flowing past the slit 96 crosses the exhaust outlet 74. This produces a negative pressure around the exhaust outlet 74. The negative pressure then acts to draw out the exhaust gas from the exhaust outlet 74. The exhaust gas can thereby be discharged in a desired direction (outwardly and laterally of the vehicle), while at the same time, discharge of the exhaust gas can be increased. Accordingly, improvement in an output of the motorcycle 1 and a reduction in fuel consumption can be promoted, while allowing the exhaust gas to be guided in any desired direction.

In addition, the ambient air flowing along the muffler side cover 52 flows past the slit 96 to build up its velocity. The ambient air in this condition is guided to the exhaust outlet 74. This enhances an exhaust gas drawing effect, while improving heat radiation performance of the muffler side cover 52 and the muffler main body 51. Accordingly, the cooling performance of the surrounding parts can be enhanced.

In the muffler device 50 according to the preferred embodiment of the present invention, the end cap 53 covering the area surrounding the exhaust outlet 74 includes the recessed portions 87 functioning as the air intake guide shaped portion. In addition, a specific one of the recessed portions 87 is provided with the exposed hole 86 for the exhaust outlet 74. This allows the ambient air that has flowed past the slit 96 to be guided smoothly up to the exhaust outlet 74. Discharge of the exhaust gas can be even further improved.

In the arrangement, in which the tail pipe 73a extends from the rear portion of the muffler main body 51 and the leading end opening thereof is made to serve as the exhaust outlet 74, the length of the tail pipe 73a extending from the muffler main body 51 can be kept small. Thus, a reduction in the weight of the muffler main body 51 can therefore be enhanced.

In the muffler device 50 according to the preferred embodiment of the present invention, the exhaust outlet 74 is disposed obliquely downwardly and outwardly of the muffler main body 51. In other words, the exhaust outlet 74 is disposed between the outer side portion and the lower side portion of the muffler main body 51. Accordingly, the exhaust outlet 74 is open to face obliquely downwardly and outwardly, in which direction there are a few number of obstacles for guiding the ambient air, such as the rear cowl 35, the rear fender 37, and the like. Thus, discharge of the exhaust gas by the ambient air can therefore be even further improved.

Further, entry of rainwater and the like through the exhaust outlet 74 can be prevented. Moreover, the exhaust outlet 74 is less noticeable, which improves the appearance and quality. Thus, the corrosion resistance and appearance quality of the muffler main body can be improved.

Further, in the muffler device 50 according to the preferred embodiment of the present invention, a connection portion for connecting the muffler main body 51 and the muffler side cover 52 is set at a location near the slit 96. Thus, the stiffness of the portion provided with the slit 96 in the muffler side cover 52 can be supplemented. Further, vibration and noise occurring as a result of the ambient air flowing past the slit 96 can therefore be suppressed.

It is to be noted that the present invention can be implemented in a variety of other manners. For example, the present invention can be implemented as follows. More specifically, for example, an arrangement may be made, in which the exhaust outlet 74 is disposed near the outer surface of the muffler main body 51, instead of extending the tail pipe 73a. In such an arrangement, the end cap 53 may be disused. On the contrary, the muffler side cover 52 may be disused and the ambient air is guided only with the recessed portions 87 of the end cap 53. Alternatively, an arrangement may be made, in which an outside air introduction portion is formed by changing part of the muffler side cover 52 radially outwardly and a slit functioning as an air intake guide shaped portion is formed at a front end portion of the outside air introduction portion. Alternatively, the muffler side cover 52 and the exhaust outlet 74 may overlap each other in a side view thereof. Alternatively, a plurality of connection portions may be set near the slit 96, and a fastening device may be used for each of these connection portions.

Figure 10:
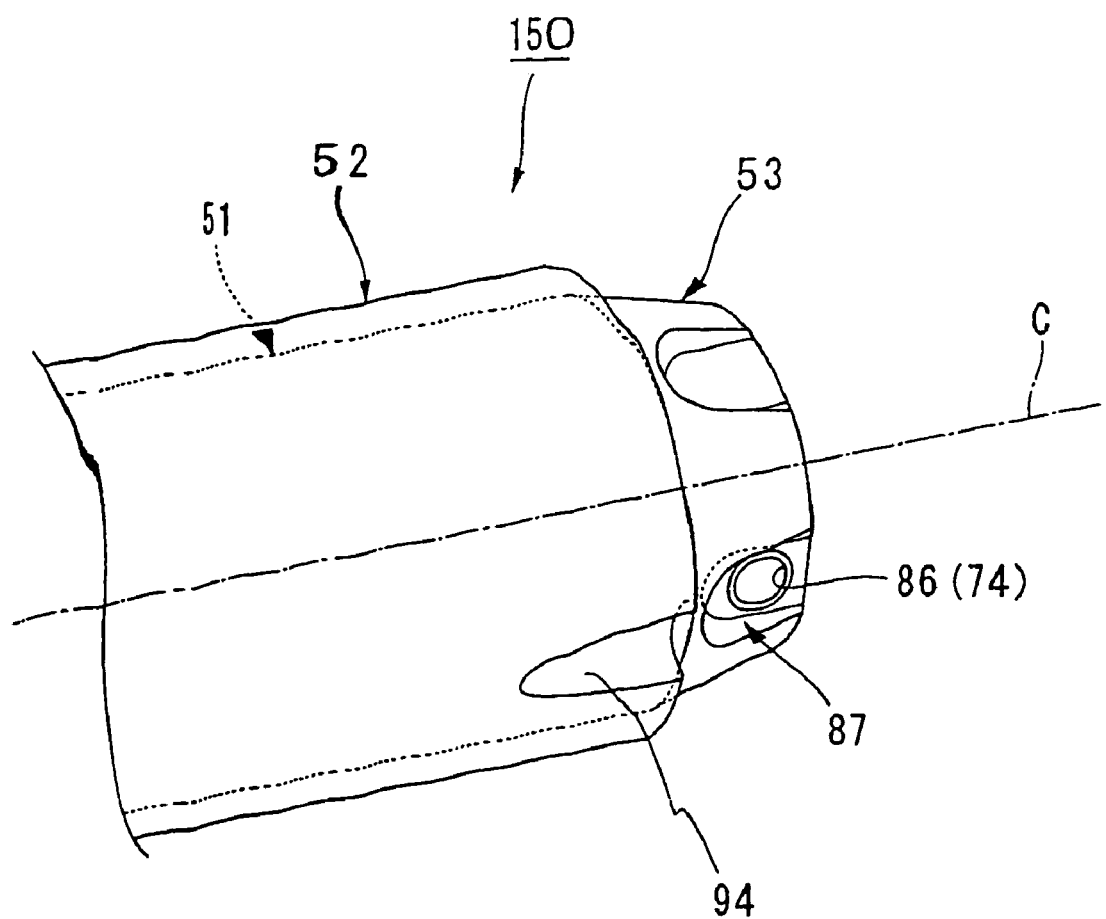
FIG. 10 is a perspective view showing a first modification of the muffler device.

Referring to FIG. 10 showing a muffler device 150, it is appropriate that a guide wall 94 be formed so as to reach a rear end edge of a muffler side cover 52. The guide wall 94 may thereby be made to serve as an air intake guide shaped portion for guiding the ambient air.

Figure 11A:
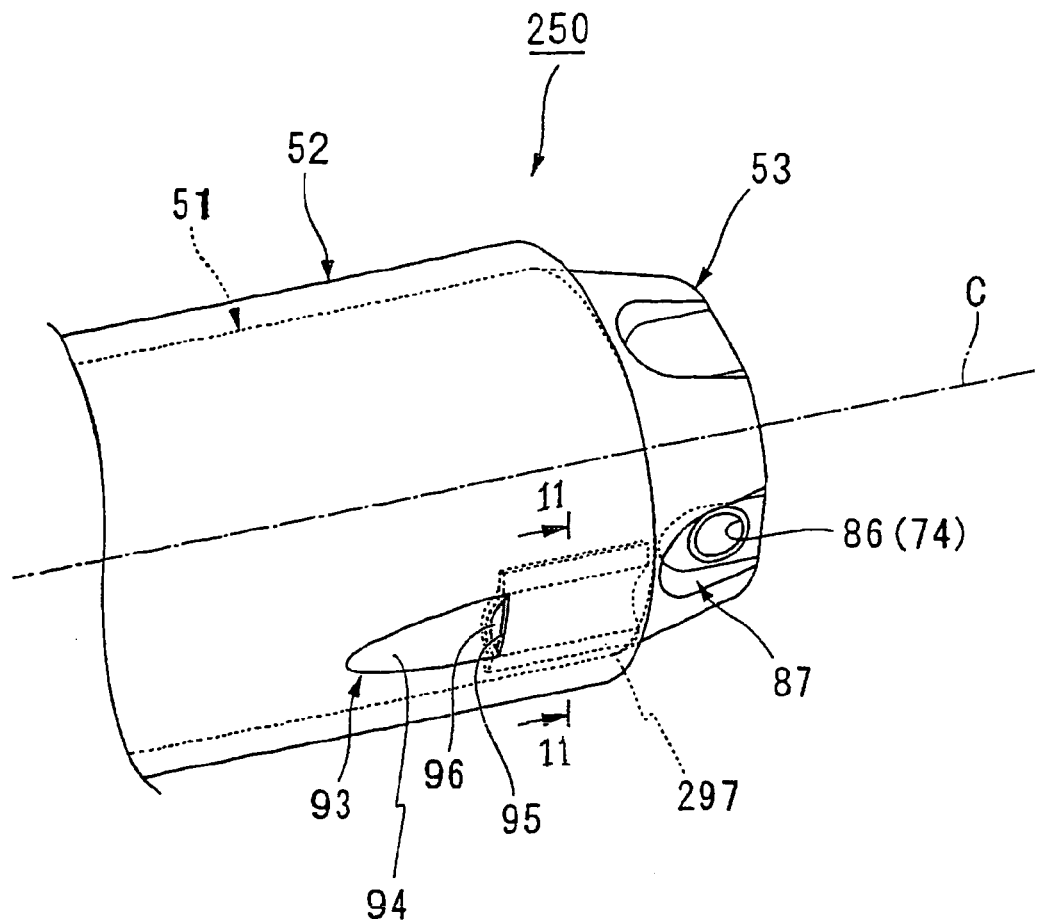
FIG. 11(a) is a perspective view showing a second modification of the muffler device.
Figure 11B:
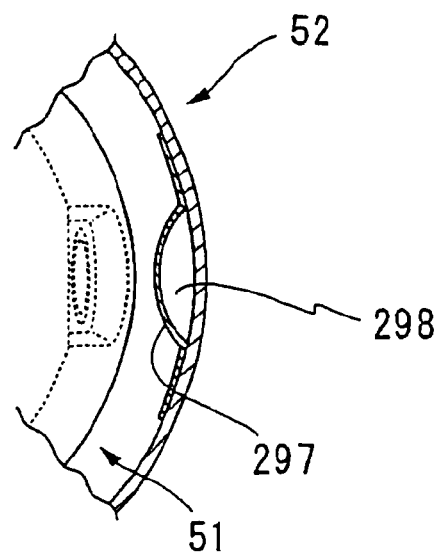
FIG. 11(b) is a cross sectional view taken along line 11-11 of FIG. 11(a)

Referring to FIGS. 11(a) and 11(b) showing a muffler device 250, it is appropriate that an outside air introduction portion 93 and a slit 96 are provided forward of an exhaust outlet 74 with a predetermined distance away therefrom. Further, an air intake plate 297 may be provided on the backside of a muffler side cover 52 so as to form an outside air flow path 298 extending from the slit 96 to a rear end edge of the muffler side cover 52. The slit 96 and the air intake plate 297 may thereby be formed as an air intake guide shaped portion for guiding the ambient air.

Figure 12A:
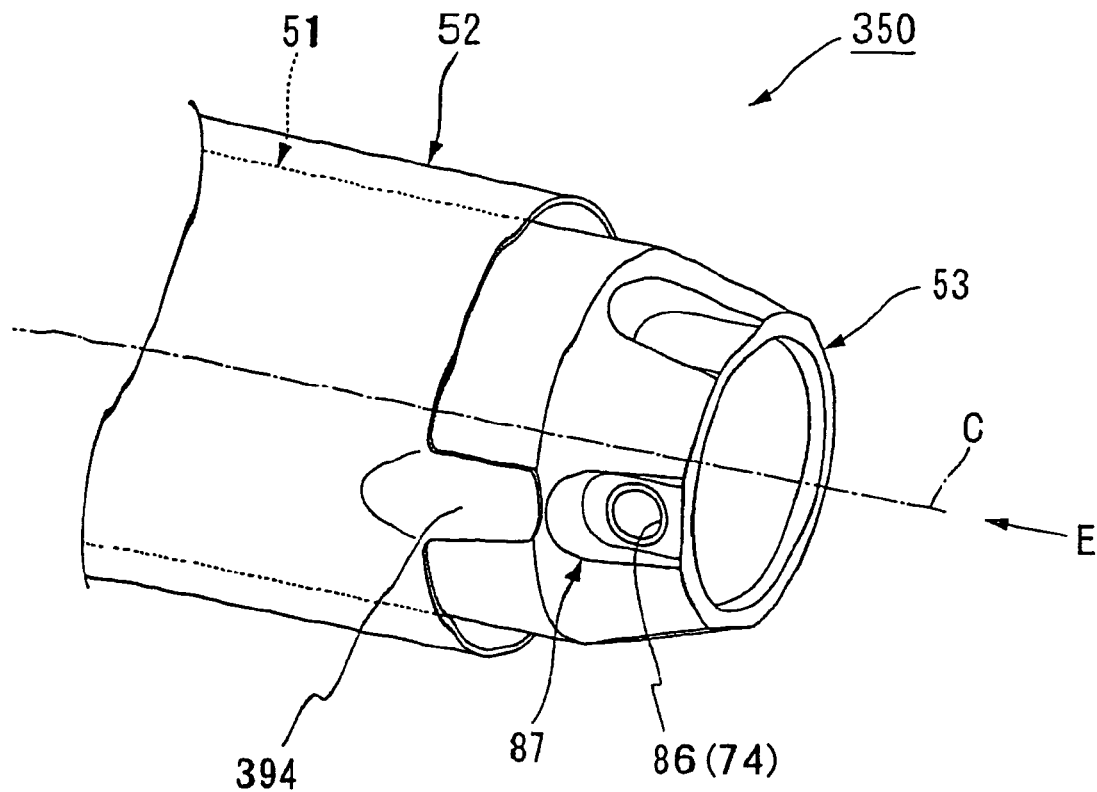
FIG. 12(a) is a perspective view showing a third modification of the muffler device.
Figure 12B:
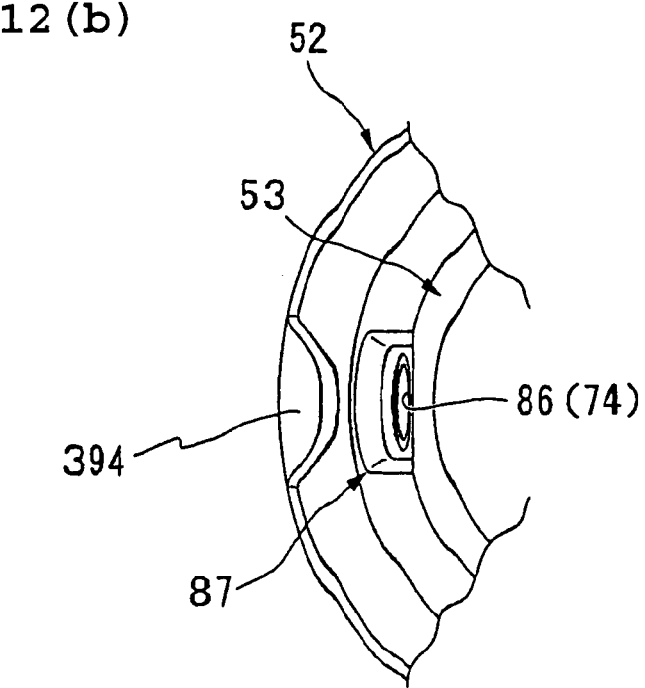
FIG. 12(b) is a view on arrow E of FIG. 12(a).

Referring to FIGS. 12(a) and 12(b) showing a muffler device 350, it is appropriate that a flap 394 extending rearwardly from a rear end edge of a muffler side cover 52 be provided. The flap 394 may then be formed such that a rear end side thereof is bent obliquely so as to be located radially inwardly. The flap 394 may thereby be formed as an air intake guide shaped portion for guiding the ambient air.

It is also appropriate that the air intake guide shaped portion, such as the slit 96, the guide wall 94, and the like, be provided in an end cap 53, instead of the muffler side cover 52.

It should be noted that the arrangements according to the preferred embodiment of the present invention are only exemplary cases and the present invention can be applied to a type of vehicle other than the motorcycle. The present invention can be implemented in various manners without departing from the spirit thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A muffler device connected to a rear end portion of an exhaust pipe that extends from an internal combustion engine of a vehicle, comprising:
   a muffler main body;
   an exhaust outlet disposed at a rear portion of the muffler main body, opening outwardly and laterally of the vehicle; and
   a muffler cover mounted on an outer tube of the muffler main body, the muffler cover serving as a muffler side cover,
   wherein the muffler side cover includes an formed by a changing part of the muffler side cover, an outside air introduction portion being formed along a rear section of the muffler side cover that overlaps the muffler main body and extending radially inward part way toward the muffler main body, and
   wherein a rear end of the outside air introduction portion includes an air intake guide shaped portion for guiding ambient air to the exhaust outlet,
   wherein the air intake guide shaped portion has a length extending in a fore-aft direction, a width that increases continuously in a direction from a front end to a rear end thereof, and a depth that increases in a radial direction toward the rear end relative to the front end thereof.

2. The muffler device according to claim 1, wherein the muffler side cover is fitted to an outer periphery of the muffler main body, the muffler side cover including a slit provided as the air intake guide shaped portion.

3. The muffler device according to claim 1, wherein the muffler cover includes an end cap for covering an area surrounding the exhaust outlet of the muffler main body, the end cap including a recessed portion that is provided directly rearward of the air intake guide shaped portion, and the recessed portion including an exposed hole provided for the exhaust outlet.

4. The muffler device according to claim 2, wherein the muffler cover includes an end cap for covering an area surrounding the exhaust outlet of the muffler main body, the end cap including a recessed portion that is provided rearward of the air intake guide shaped portion, and the recessed portion including an exposed hole provided for the exhaust outlet.

5. The muffler device according to claim 1, wherein the exhaust outlet is located between an outer side portion and a lower side portion of the muffler main body.

6. The muffler device according to claim 2, wherein the exhaust outlet is located between an outer side portion and a lower side portion of the muffler main body.

7. The muffler device according to claim 3, wherein the exhaust outlet is located between an outer side portion and a lower side portion of the muffler main body.

8. The muffler device according to claim 1, wherein at least one connection portion for connecting the muffler main body and the muffler side cover is disposed at an area near the air intake guide shaped portion.

9. The muffler device according to claim 2, wherein at least one connection portion for connecting the muffler main body and the muffler side cover is disposed at an area near the air intake guide shaped portion.

10. The muffler device according to claim 3, wherein at least one connection portion for connecting the muffler main body and the muffler side cover is disposed at an area near the air intake guide shaped portion.

11. The muffler device according to claim 4, wherein at least one connection portion for connecting the muffler main body and the muffler side cover is disposed at an area near the air intake guide shaped portion.

12. A muffler device adapted to be connected to a rear end portion of an exhaust pipe, comprising:
    a muffler main body;
    an exhaust outlet disposed at a rear portion of the muffler main body, opening outwardly and laterally therefrom; and
    a muffler cover provided for the muffler main body, the muffler cover serving as a muffler side cover
    wherein the muffler side cover includes an outside air introduction portion with an air intake guide shaped portion for guiding ambient air to the exhaust outlet, the outside air introduction portion having a concave guide wall with a length extending in a fore-aft direction, and a width that increases continuously in a direction from a front end to a rear end thereof.

13. The muffler device according to claim 12, wherein the muffler side cover is fitted to an outer periphery of the muffler main body, the muffler side cover including a slit serving as the air intake guide shaped portion at the rear end of the concave guide wall of the outside air introduction portion.

14. The muffler device according to claim 12, wherein the muffler cover includes an end cap for covering an area surrounding the exhaust outlet of the muffler main body, the end cap including a recessed portion provided directly rearward of the air intake guide shaped portion, and the recessed portion including an exposed hole provided for the exhaust outlet.

15. The muffler device according to claim 13, wherein the muffler cover includes an end cap for covering an area surrounding the exhaust outlet of the muffler main body, the end cap including a recessed portion provided directly rearward of the air intake guide shaped portion, and the recessed portion including an exposed hole provided for the exhaust outlet.

16. The muffler device according to claim 12, wherein the exhaust outlet is located between an outer side portion and a lower side portion of the muffler main body.

17. The muffler device according to claim 13, wherein the exhaust outlet is located between an outer side portion and a lower side portion of the muffler main body.

18. The muffler device according to claim 14, wherein the exhaust outlet is located between an outer side portion and a lower side portion of the muffler main body.

19. The muffler device according to claim 12, wherein at least one connection portion for connecting the muffler main body and the muffler side cover is disposed at an area near the air intake guide shaped portion.

20. The muffler device according to claim 12, wherein the air intake guide shaped portion includes a riser wall at the rear end of the concave guide wall, the concave guide wall increasing in depth in a radial direction toward the rear end relative to the front end thereof.

* * * * *